US011617959B2

(12) United States Patent
Malan et al.

(10) Patent No.: US 11,617,959 B2
(45) Date of Patent: Apr. 4, 2023

(54) DETECTION OF MALICIOUS GAMES

(71) Applicant: Roblox Corporation, San Mateo, CA (US)

(72) Inventors: Arthur Remy Malan, Menlo Park, CA (US); Diana Lee, San Mateo, CA (US); Michael McHale, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 77 days.

(21) Appl. No.: 17/335,864

(22) Filed: Jun. 1, 2021

(65) Prior Publication Data
US 2021/0283507 A1 Sep. 16, 2021

Related U.S. Application Data

(62) Division of application No. 16/523,811, filed on Jul. 26, 2019, now Pat. No. 11,058,953.

(51) Int. Cl.
A63F 13/73 (2014.01)
G06F 16/955 (2019.01)
G06F 21/56 (2013.01)

(52) U.S. Cl.
CPC ............ A63F 13/73 (2014.09); G06F 16/955 (2019.01); G06F 21/56 (2013.01)

(58) Field of Classification Search
None
See application file for complete search history.

(56) References Cited

U.S. PATENT DOCUMENTS

| 7,085,928 | B1 | 8/2006 | Schmid et al. |
| 8,888,585 | B1 | 11/2014 | Beechey et al. |
| 9,558,352 | B1 | 1/2017 | Dennison et al. |
| 10,289,845 | B2 | 5/2019 | Charters et al. |
| 10,666,677 | B2 | 5/2020 | Casey et al. |
| 10,686,812 | B2 | 6/2020 | Falk et al. |
| 2004/0054917 | A1 | 3/2004 | Obrecht et al. |
| 2007/0226259 | A1 | 9/2007 | Kacin et al. |
| 2011/0083180 | A1 | 4/2011 | Mashevsky et al. |
| 2014/0181973 | A1 | 6/2014 | Lee et al. |
| 2016/0042179 | A1 | 2/2016 | Weingarten et al. |
| 2016/0292419 | A1 | 10/2016 | Langton et al. |
| 2019/0005236 | A1* | 1/2019 | Singh ............... G06F 21/566 |
| 2020/0074081 | A1* | 3/2020 | Srinivasagopalan ........ G06K 9/6215 |
| 2020/0089883 | A1* | 3/2020 | Morris ............... G06F 21/52 |
| 2021/0248234 | A1* | 8/2021 | Srinivasagopalan ........ G06F 21/563 |

FOREIGN PATENT DOCUMENTS

| KR | 20150085741 | 7/2015 |
| KR | 20160031589 | 3/2016 |

OTHER PUBLICATIONS

USPTO, Notice of Allowance for U.S. Appl. No. 16/523,811, dated Apr. 21, 2021, 7 pages.

(Continued)

Primary Examiner — Ronald Laneau
(74) Attorney, Agent, or Firm — IP Spring

(57) ABSTRACT

Some implementations relate detection of malicious games. In some implementations, a computer-implemented method includes obtaining a list of games that includes a plurality of games, analyzing the plurality of games to identify at least one likely malicious game, and creating a ticket.

20 Claims, 8 Drawing Sheets

(56) References Cited

OTHER PUBLICATIONS

USPTO, Restriction Requirement for U.S. Appl. No. 16/523,811, dated Aug. 17, 2020, 8 pages.
USPTO, Non-final Office Action for U.S. Appl. No. 16/523,811, dated Dec. 4, 2020, 7 pages.
WIPO, International Search Report for International Patent Application No. PCT/US2019/051803, dated Feb. 7, 2020, 4 pages.
WIPO, Written Opinion for International Patent Application No. PCT/US2019/051803, dated Feb. 7, 2020, 9 pages.
KIPO, Office Action (with English translation) for Korean Patent Application No. 10-2022-7002647, dated Jun. 21, 2022, 10 pages.
KIPO, Notice of Final Rejection (with English translation) for Korean Patent Application No. 10-2022-7002647, dated Oct. 28, 2022, 8 pages.
KIPO, Notice of Allowance (with English translation) for Korean Patent Application No. 10-2022-7002647, dated Feb. 14, 2023, 3 pages.

* cited by examiner

```
{"sorts":
 [
         {"token":"T123456",
          "name":"Popular",
          "tokenExpiryInSeconds":3600.0}, {"token":"T123457",
          "name":"TopRated",
          "tokenExpiryInSeconds":1800.0}
 ]}
```

240

250a
T123456
Game 1: Dungeons and Dinosaurs
Game 2: Kingdom of Thrones
Game 3: Game of Bones 250b
T123457
Game 1: Kitchen Builder
Game 2: Modular home construction
...

FIG. 2B

DETECTION OF MALICIOUS GAMES

CROSS-REFERENCE TO RELATED APPLICATIONS

The present application is a divisional under 35 U.S.C. § 121 of U.S. patent application Ser. No. 16/523,811, filed Jul. 26, 2019 and titled DETECTION OF MALICIOUS GAMES, the contents of which are incorporated herein by reference in their entirety.

TECHNICAL FIELD

Embodiments relate generally to computer-based gaming, and more particularly, to methods, systems, and computer readable media to detect malicious games in computer-based gaming.

BACKGROUND

Some online gaming platforms, allow users to connect with each other, interact with each other (e.g., within a game), create games, and share information with each other via the Internet. Users of online gaming platforms may participate in multiplayer gaming environments (e.g., in virtual three-dimensional environments), design custom gaming environments, design characters and avatars, decorate avatars, exchange virtual items with other users, communicate with other users using audio or text messaging, and so forth. Malicious users may create user-generated content that can cause harm to other users of the platform.

SUMMARY

Implementations described herein relate to detection of malicious games. In some implementations, a computer-implemented method includes obtaining a list of games. In some implementations, the list includes a plurality of games. In some implementations, the method includes analyzing the plurality of games to identify at least one likely malicious game.

In at least some implementations, the analyzing comprises comparing words from a description associated with each game of the plurality of games to one or more keywords associated with known malicious games.

In some implementations, the method includes creating a ticket. In some implementations, the ticket identifies the likely malicious game and includes one or more descriptors of the likely malicious game.

In some implementations, the method includes prior to creating the ticket, verifying that a predetermined time period has elapsed from a previous ticket creation time associated with the likely malicious game. In some implementations, the method includes removing the likely malicious game from the list of games, and after the removing, generating a user interface that includes one or more games from the list of games.

In some implementations, obtaining the list comprises retrieving names of the plurality of games that are currently being highlighted on a game platform. In some implementations, the one or more keywords associated with known malicious games are generated using prior tickets that resulted in detection of a malicious game.

In some implementations, the one or more descriptors comprises a title of the likely malicious game, an owner of the likely malicious game, a link to an account of the owner of the likely malicious game, a uniform resource locator (URL) to the likely malicious game, number of upvotes or downvotes for the likely malicious game, and player count for the likely malicious game at a time of generation of the list.

In some implementations, analyzing the plurality of games to identify at least one likely malicious game further comprises comparing a profile parameter of each game of the list of games against a threshold profile, wherein the profile parameter is indicative of a rate of change of game popularity.

Some implementations include a non-transitory computer-readable medium comprising instructions that, responsive to execution by a processing device, causes the processing device to perform operations comprising obtaining a list of games. In some implementations, the list includes a plurality of games.

In some implementations, the operations include analyzing the plurality of games to identify at least one likely malicious game. In some implementations, analyzing comprises comparing words from a description associated with each game of the plurality of games to one or more keywords associated with known malicious games. In some implementations, the operations include creating a ticket, wherein the ticket identifies the likely malicious game and includes one or more descriptors of the likely malicious game.

In some implementations, the operations further comprise, prior to creating the ticket, verifying that a predetermined time period has elapsed from a previous ticket creation time associated with the likely malicious game. In some implementations, obtaining the list comprises retrieving names of the plurality of games that are currently being highlighted on a game platform.

Some implementations include a computer-implemented method comprising obtaining a list of games. In some implementations, the list includes a plurality of games.

In some implementations, the method includes analyzing the list of games to identify a likely malicious game. In some implementations, analyzing the list comprises comparing a profile parameter of each game of the plurality of games against a threshold profile. In some implementations, the profile parameter is indicative of a rate of change of game popularity. In some implementations, the method includes creating a ticket, wherein the ticket comprises the likely malicious game.

In some implementations, the method includes prior to creating the ticket, verifying that a predetermined time period has elapsed from a previous ticket creation time associated with the likely malicious game.

In some implementations, the method includes removing the likely malicious game from the list of games prior to generating a user interface that includes one or more games from the list of games. In some implementations, obtaining the list comprises retrieving names of the plurality of games that are currently being highlighted on a game platform. In some implementations, the profile parameter comprises a measure of suddenness of appearance of the game on a list of popular games. In at least some implementations, the profile parameter further comprises a measure of number of players associated with the game at a time of first appearance of the game on the list of popular games.

In some implementations, analyzing the list of games to identify the likely malicious game further comprises comparing words from a description associated with each game of the plurality of games to one or more keywords associated with known malicious games.

Some implementations include a system comprising a memory with instructions stored thereon and processing device, coupled to the memory, the processing device configured to access the memory and execute the instructions that cause the processing device to perform operations including obtaining a list of games. In some implementations, the list includes a plurality of games.

In some implementations, the operations include analyzing the list of games to identify a likely malicious game. In some implementations, analyzing the list comprises comparing a profile parameter of each game of the plurality of games against a threshold profile. In some implementations, the profile parameter is indicative of a rate of change of game popularity. In some implementations, the operations include creating a ticket that comprises the likely malicious game.

Some implementations include a computer-implemented method comprising calculating a first score for a game based on respective feedback metrics received from a plurality of paying users, calculating a second score for the game based on respective feedback metrics received from a plurality of non-paying users, calculating a quality measure for the game based on aggregating the first score and the second score, comparing the quality measure of the game against a threshold, determining the game to be a likely malicious game when the quality measure of the game meets the threshold, and creating a ticket that identifies the likely malicious game.

In some implementations, the method further includes applying a metric weight to each feedback metric from the plurality of paying users prior to calculating the first score. In some implementations, the method includes applying a score weight to the first score prior to calculating the quality measure.

In some implementations, the method includes prior to creating the ticket, verifying that a predetermined time period has elapsed from a previous ticket creation time associated with the likely malicious game. In some implementations, the method includes receiving a list of games that includes the likely malicious game, removing the likely malicious game from the list of games to create a second list of games, and generating a user interface that includes the second list of games.

In some implementations, the first score and the second score are respective Wilson scores. In some implementations, the method includes computing the threshold for the game based on a total number of the plurality of paying users and the plurality of non-paying users.

In at least some implementations, the feedback metrics include at least one of an upvote received for the game or a downvote received for the game. In some implementations, the threshold is a predetermined parameter independent of a total number of the plurality of paying users of the game and the plurality of non-paying users of the game.

Some implementations include a non-transitory computer-readable medium comprising instructions that, responsive to execution by a processing device, causes the processing device to perform operations comprising calculating a first score for a game based on respective feedback metrics received from a plurality of paying users, calculating a second score for the game based on respective feedback metrics received from a plurality of non-paying users, calculating a quality measure for the game based on aggregating the first score and the second score, comparing the quality measure against a threshold, determining the game to be a likely malicious game when the quality measure meets the threshold, and creating a ticket, wherein the ticket comprises the likely malicious game.

In some implementations, the operations further includes applying a metric weight to each feedback metric from the plurality of paying users, prior to calculating the first score. In some implementations, the operations further comprise applying a score weight to the first score prior to calculating the quality measure. In some implementations, the first score and second score are respective Wilson scores.

In some implementations, the operations further comprise computing the threshold for the game based on a total number of the plurality of paying users and the plurality of non-paying users. In some implementations, the feedback metrics include at least one of an upvote received for the game or a downvote received for the game.

BRIEF DESCRIPTION OF THE DRAWINGS

FIG. 2B is a diagram illustrating data structures associated with game sorts, in accordance with some implementations.

DETAILED DESCRIPTION

Figure 1:
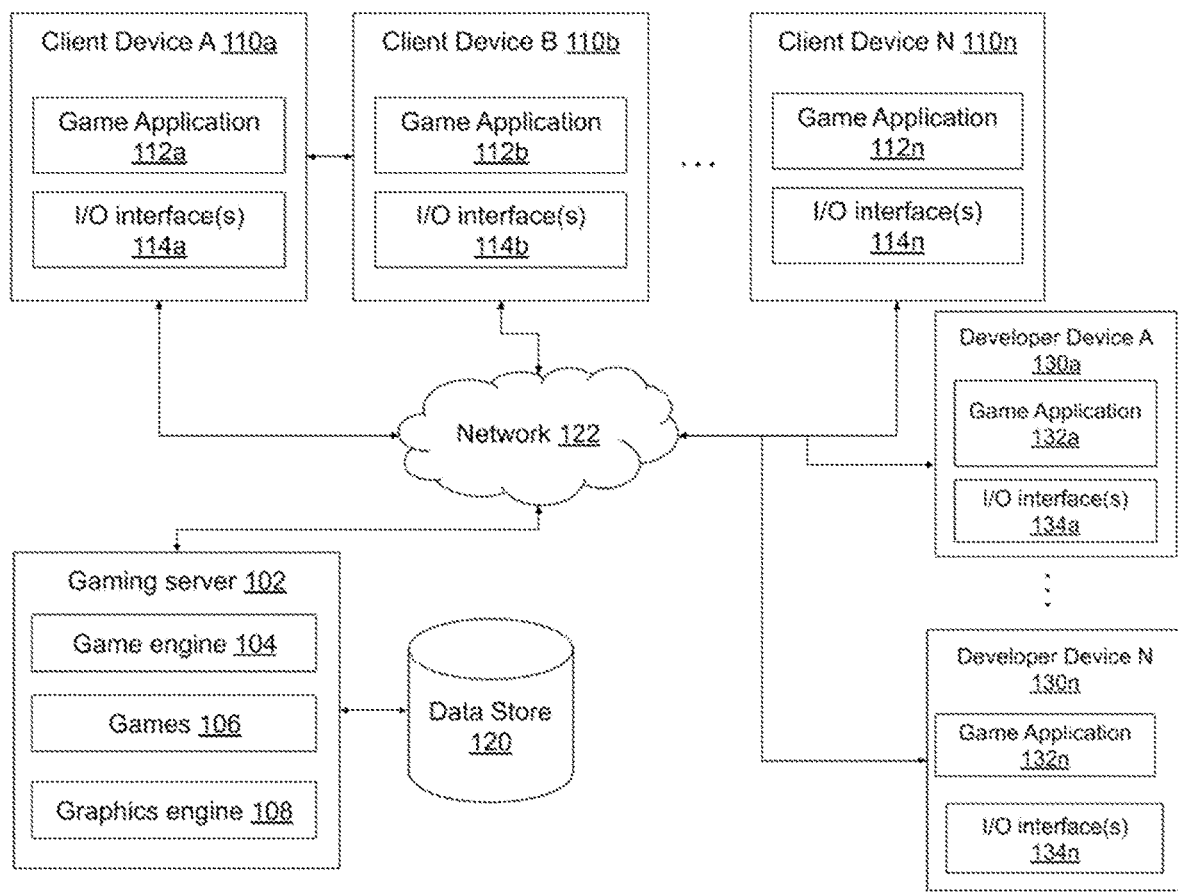
FIG. 1 is a diagram of an example system architecture in which malicious games may be detected, in accordance with some implementations.

Online gaming platforms (also referred to as "user-generated content platforms" or "user-generated content systems") offer a variety of ways for users to interact with one another. For example, users of an online gaming platform may work together towards a common goal, share various virtual gaming items, send electronic messages to one another, and so forth. Users of an online gaming platform may join games as virtual characters, playing game-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single human player is part of a game while other players are simulated by a computer.

An online gaming platform may also allow users (developers) of the platform to create new games and characters. For example, users of the online gaming platform may be enabled to create, design, and/or customize new games, and make such games available to users of the online gaming platform.

A risk posed in gaming platforms that allow creators to make games and publish the games for other players is the creation and availability of malicious games. Malicious games may be created by user(s) who build games that are malicious or otherwise offensive; for example, a game that tries to entice a player to reveal their username and password (a "phishing game"). Players that inadvertently get lured by the phishing game may have their accounts on the gaming platform compromised and lose any items of value in those accounts. Some malicious games may cause a user to be tricked into paying virtual currency in the game, or may divert the user to a malicious web site or service that is off the game platform.

Malicious game are commonly reported by players to the game platform owner who then remove (take down) access to the game and even delete the malicious game creator's account. Therefore, malicious creators have an incentive to get as many players as possible to play their game in the shortest possible time in order to maximize the return on their effort in the creation of the malicious game. To attract a large number of players in a short time, malicious creators attempt to create a false sense of popularity or other importance for their game. For example, malicious game creators may achieve this by creating fake user accounts on the gaming platform that they attach to their game to make it appear popular. Malicious game creators may additionally provide positive ratings (upvotes) to malicious games to further increase a perception of popularity by artificially boosting game statistics. For example, game statistics may be manipulated by the use of bots and/or fake accounts, misrepresentation of content, impersonation of another popular game, etc. This may result in a malicious game entering one or more system-wide rankings, e.g., that are used to highlight games to users of the online gaming platform.

For example, the gaming platform may highlight games that have high number of active players at a particular time in a list of "currently popular" games, games that have a large number of players that joined within a recent time window in a list of "trending" games, games that have been newly made available on the platform in a list of "fresh" games, games that have high ratings from the users as "top-rated" games, "top-favorited" games that are marked as a favorite by a large number of users, etc. Such lists may be platform-wide and/or specific to geographic locations, and/or specific to individual game categories such as "puzzle," "action adventure," "social," etc. If a malicious game creator manages to create a game that meets the criteria for inclusion in one or more of these lists, or is able to artificially boost player numbers for the game, e.g., by the user of bots that join a game, such inclusion can help generate a further sense of popularity or importance for the malicious game.

An objective of a game platform owner or administrator is the prevention of harm to players on the platform from malicious game creators. Early detection of malicious games can make it difficult and/or expensive for a creator of a malicious game to create and propagate malicious games. A game platform that shuts down malicious games quickly can effectively deter malicious game creators.

A technical problem therefore is to detect malicious games on a gaming platform within a short time such that the number of users that are likely affected by the malicious game is limited. One parameter of success for a malicious game detection technique is thus the time from the launch of a malicious game on the online gaming platform to the time at which the game is detected as malicious and mitigating actions are performed. A further technical problem is to ensure that valid or legitimate games are not tagged as malicious such that users may still discover and be able to enjoy playing such games. Important technical parameters for a malicious game detection include precision, e.g., the proportion of games that are actually malicious to the total number of games detected as malicious, e.g., a number of games that were not detected as malicious, and were subsequently reported as malicious, and recall, e.g., the proportion of games that are detected as malicious to the total number of malicious games in the online gaming platform. The platform may benefit from finding malicious games as fast as possible since the platform can save computing resources to serve such games and can provide a better customer experience, e.g., a gaming environment substantially free of malicious games, which can help retain users.

FIG. 1 illustrates an example system architecture 100, in accordance with some implementations of the disclosure. FIG. 1 and the other figures use like reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110*a*," "110*b*," and/or "110*n*" in the figures).

The system architecture 100 (also referred to as "system" herein) includes online gaming server 102, data store 120, client devices 110*a*, 110*b*, and 110*n* (generally referred to as "client device(s) 110" herein), and developer devices 130*a* and 130*n* (generally referred to as "developer device(s) 130" herein). Gaming server 102, data store 120, client devices 110, and developer devices 130 are coupled via network 122. In some implementations, client devices(s) 110 and developer device(s) 130 may refer to the same or same type of device, e.g., when a user of the online gaming platform participates both as a player and a developer, for the same or different games on the platform.

Online gaming server 102 can include, among other things, a game engine 104, one or more games 106, and graphics engine 108. For example, game engine 104, games 106, and graphics engine 108 may be implemented as software that is stored and/or executed on gaming server 102. In some implementations, game engine 104 may include software code that manages gameplay for one or more games where a plurality of client devices participate, e.g., synchronization of game state, storing current game status for individual players, managing game participants (e.g., users that join or leave a game), etc. Game engine 104 may access data store 120 to store data and/or to retrieve data for one or more games.

In some implementations, gaming server 102 may store and/or execute one or more games 106. For example, gaming server 102 may store in games 106 game assets such as game environment (e.g., description or map of a virtual space, a game board, etc.), game characters, game assets (e.g., objects used during game play, etc.). Further, in some implementations, gaming server 102 may execute a particular game of the games 106, e.g., receive client input from a user device 110, update game status, and provide the updated game status (e.g., as a status update, as updated graphics, etc.) to the user devices 110 that participate in the particular game. A client device 110 can include a game application 112, and input/output (I/O) interfaces 114 (e.g., input/output devices). In some implementations, graphics engine 108 may include software code and/or hardware (e.g., ASIC, FPGA, GPU, or other dedicated processor, etc.,) to generate graphics for games 106.

In some implementations, a client device 110 may include a game application 112 and one or more I/O interfaces 114. For example, client device 110 may be any type of device that enables gameplay via gaming server 102, e.g., a desktop or laptop computer, a tablet, a smartphone, a gaming console or other gaming device, a wearable device, etc. In some implementations, the client device may be an augmented reality or virtual reality device. Game application 112 may include locally executable code and/or local data for gameplay. For example, in some implementations, when a user of a client device joins a particular game of the games 106, corresponding code and/or data may be provided by the gaming server 102 to the client device 110 of the user. In various implementations, I/O interfaces 114 can include one or more of a microphone, speakers, headphones, display device, mouse, keyboard, game controller, touchscreen, virtual reality consoles, etc. In some implementations, one or more other devices may be coupled with a client device via an I/O interface, e.g., a game controller may be connected to a tablet or laptop via a USB interface, etc.

In some implementations, developer device 130 may include a game application 132 and one or more I/O interfaces 134. For example, developer device 130 may be any type of device that enables gameplay via gaming server 102, e.g., a desktop or laptop computer, a tablet, a smartphone, a gaming console or other gaming device, a wearable device, etc. In some implementations, the client device may be an augmented reality or virtual reality device. Game application 132 may include executable code and/or local data for gameplay that may be provided to gaming server 102 and to a client device 110. For example, in some implementations, a user of a developer device may provide (for example, by uploading via network 122) corresponding code and/or data that may be provided to the gaming server 102 and to the client device 110. In various implementations, IO interfaces 134 can include one or more of a microphone, speakers, headphones, display device, mouse, keyboard, game controller, touchscreen, virtual reality consoles, etc. In some implementations, one or more other devices may be coupled with a client device via an IO interface, e.g., a game controller may be connected to a tablet or laptop via a USB interface, etc.

In some implementations, game application 132 may include software code that enables users to generate new games, including game assets such as avatars, clothing, accessories, etc., game environments (race track layout for a car racing game; room layout for a maze; board layout for a puzzle; etc.), and game descriptors (title, keywords, description) etc. that may be utilized by users to discover games.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers).

In some implementations, the online gaming server 102 can include a server having one or more computing devices (e.g., a cloud computing system, a rackmount server, a server computer, cluster of physical servers, etc.). In some implementations, the online gaming server 102 may be an independent system, may include multiple servers, or be part of another system or server.

In some implementations, the online gaming server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming server 102 and to provide a user with access to online gaming server 102. The online gaming server 102 may also include a web site (e.g., a webpage) or application back-end software that may be used to provide a user with access to content provided by online gaming server 102. For example, users may access online gaming server 102 using the game application 112 on client devices 110.

In some implementations, online gaming server 102 may be a type of social network providing connections between users or a type of user-generated content system that allows users (e.g., end-users or consumers) to communicate with other users on the online gaming server 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming server 102 may be a virtual gaming server. For example, the gaming server may provide single-player or multiplayer games to a community of users that may access or interact with games using client devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to the interaction of one or more players using client devices (e.g., 110) within a game (e.g., 106) or the presentation of the interaction on a display or other output device (e.g., 114) of a client device 110.

In some implementations, a game 106 can include an electronic file that can be executed or loaded using software, firmware or hardware configured to present the game content (e.g., digital media item) to an entity. In some implementations, a game application 112 may be executed and a game 106 rendered in connection with a game engine 104. In some implementations, a game 106 may have a common set of rules or common goal, and the environment of a game 106 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game application 106 may be collectively referred to a "world" or "gaming world" or "virtual world" or "universe" herein. An example of a world may be a 3D world of a game 106. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming server 102 can host one or more games 106 and can permit users to interact with the games 106 using a game application 112 of client devices 110. Users of the online gaming server 102 may play, create, interact with, or build games 106, communicate with other users, provide reviews of games (upvotes and/or downvotes), and/or create and build objects (e.g., also referred to as "item(s)" or "game objects" or "virtual game item(s)" herein) of games 106. For example, in generating user-generated virtual items, users may create characters, decoration for the characters, one or more virtual environments for an interactive game, or build structures used in a game 106, among others. In some implementations, users may buy, sell, or trade game virtual game objects, such as in-platform currency (e.g., virtual currency), with other users of the online gaming server 102. In some implementations, the virtual currency may be provided with a unique name within the game platform (e.g. Robux). In some implementations, online gaming server 102 may transmit game content to game applications (e.g., 112). In some implementations, game content (also referred to as "content" herein) may refer to any data or software instructions (e.g., game objects, game, user information, video, images, commands, media item, etc.) associated with online gaming server 102 or game applications. In some implementations, game objects (e.g., also referred to as "item(s)" or "objects" or "virtual game item(s)" herein) may refer to objects that are used, created, shared or otherwise depicted in game applications 106 of the online gaming server 102 or game applications 112 of the client devices 110. For example, game objects may include a part, model, character, tools, weapons, clothing, buildings, vehicles, currency, flora, fauna, components of the aforementioned (e.g., windows of a building), and so forth.

It may be noted that the online gaming server 102 hosting games 106, is provided for purposes of illustration. In some implementations, online gaming server 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 106 may be associated with a particular user or a particular group of users (e.g., a private game), or made widely available to users with access to the online gaming server 102 (e.g., a public game). In some implementations, where online gaming server 102 associates one or more games 106 with a specific user or group of users, online gaming server 102 may associated the specific user(s) with a game 102 using user account information (e.g., a user account identifier such as username and password).

In some implementations, online gaming server 102 or client devices 110 may include a game engine 104 or game application 112. In some implementations, game engine 104 may be used for the development or execution of games 106. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, physics commands, etc.) In some implementations, game applications 112 of client devices 110/116, respectively, may work independently, in collaboration with game engine 104 of online gaming server 102, or a combination of both.

In some implementations, both the online gaming server 102 and client devices 110 may execute a game engine (104 and 112, respectively). The online gaming server 102 using game engine 104 may perform some or all the game engine functions (e.g., generate physics commands, rendering commands, etc.), or offload some or all the game engine functions to game engine 104 of client device 110. In some implementations, each game 106 may have a different ratio between the game engine functions that are performed on the online gaming server 102 and the game engine functions that are performed on the client devices 110. For example, the game engine 104 of the online gaming server 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming server 102 and client device 110 may be changed (e.g., dynamically) based on gameplay conditions. For example, if the number of users participating in gameplay of a particular game 106 exceeds a threshold number, the online gaming server 102 may perform one or more game engine functions that were previously performed by the client devices 110.

For example, users may be playing a game 106 on client devices 110, and may send control instructions (e.g., user inputs, such as right, left, up, down, user election, or character position and velocity information, etc.) to the online gaming server 102. Subsequent to receiving control instructions from the client devices 110, the online gaming server 102 may send gameplay instructions (e.g., position and velocity information of the characters participating in the group gameplay or commands, such as rendering commands, collision commands, etc.) to the client devices 110 based on control instructions. For instance, the online gaming server 102 may perform one or more logical operations (e.g., using game engine 104) on the control instructions to generate gameplay instruction for the client devices 110. In other instances, online gaming server 102 may pass one or more or the control instructions from one client device 110 to other client devices (e.g., from client device 110a to client device 110b) participating in the game 106. The client devices 110 may use the gameplay instructions and render the gameplay for presentation on the displays of client devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming server 102. In other implementations, the control instructions may be sent from a client device 110 to another client device (e.g., from client device 110b to client device 110n), where the other client device generates gameplay instructions using the local game engine 104. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that allow a client device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, the online gaming server 102 may store characters created by users in the data store 120. In some implementations, the online gaming server 102 maintains a character catalog and game catalog that may be presented to users. In some implementations, the game catalog includes images of games stored on the online gaming server 102. In addition, a user may select a character (e.g., a character created by the user or other user) from the character catalog to participate in the chosen game. The character catalog includes images of characters stored on the online gaming server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online gaming server 102 at any given moment. It may be noted that the number of client devices 110 is provided as illustration. In some implementations, any number of client devices 110 may be used.

In some implementations, each client device 110 may include an instance of the game application 112, respectively. In one implementation, the game application 112 may permit users to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application may be an online gaming server application for users to build, create, edit, upload content to the online gaming server 102 as well as interact with online gaming server 102 (e.g., play games 106 hosted by online gaming server 102). As such, the game application may be provided to the client device(s) 110 by the online gaming server 102. In another example, the game application may be an application that is downloaded from a server.

In some implementations, each developer device 130 may include an instance of the game application 132, respectively. In one implementation, the game application 132 may permit a developer user(s) to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to developer device 130 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application 132 may be an online gaming server application for users to build, create, edit, upload content to the online gaming server 102 as well as interact with online gaming server 102 (e.g., provide and/or play games 106 hosted by online gaming server 102). As such, the game application may be provided to the developer device(s) 130 by the online gaming server 102. In another example, the game application 132 may be an application that is downloaded from a server. Game application 132 may be configured to interact with online gaming server 102 and obtain access to user credentials, user currency, etc. for one or more games 106 developed, hosted, or provided by a game developer.

In some implementations, a user may login to online gaming server 102 via the game application. The user may access a user account by providing user account information (e.g., username and password) where the user account is associated with one or more characters available to participate in one or more games 106 of online gaming server 102. In some implementations, with appropriate credentials, a game developer may obtain access to game virtual game objects, such as in-platform currency (e.g., virtual currency), avatars, special powers, accessories, that are owned by or associated with other users.

In general, functions described in one implementation as being performed by the online gaming server 102 can also be performed by the client device(s) 110, or a server, in other implementations if appropriate. In addition, the functionality attributed to a particular component can be performed by different or multiple components operating together. The online gaming server 102 can also be accessed as a service provided to other systems or devices through appropriate application programming interfaces (APIs), and thus is not limited to use in websites. In some implementations, the online gaming server 102 may perform one or more of the operations described below in connection with the flow charts shown in FIGS. 3, 4, and 5.

In some implementations, online gaming server 102 may include a graphics engine 108. In some implementations, the graphics engine 108 may be a system, application, or module that permits the online gaming server 102 to provide graphics and animation capability.

Figure 2A:
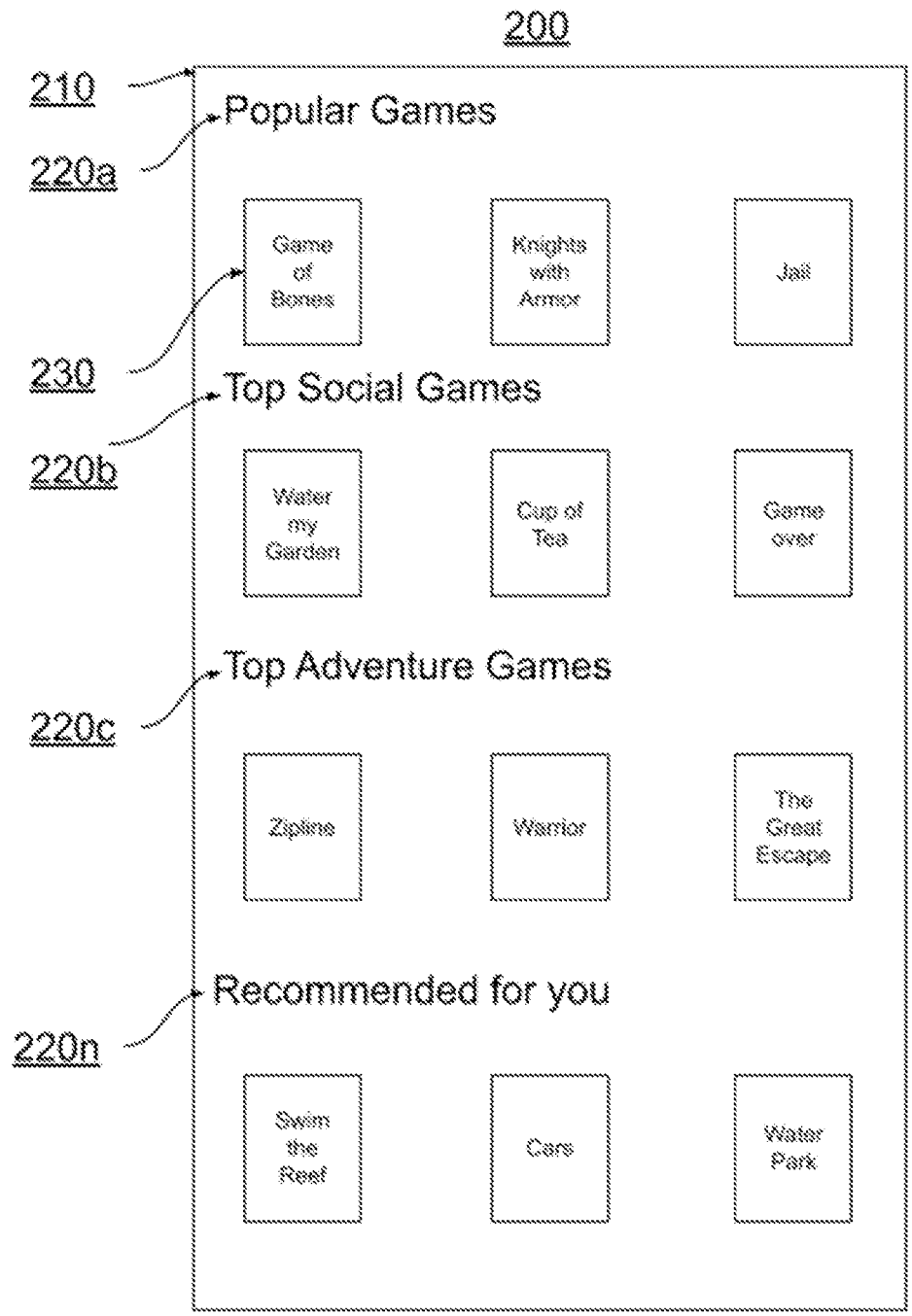
FIG. 2A is a diagram illustrating an example list of games, in accordance with some implementations.

FIG. 2A is a diagram illustrating an example list of games, in accordance with some implementations.

Online gaming server 102 may generate one or more lists of games that are available on a game platform. A user interface may be provided to users that includes one or more lists of games. Each list of games may include a plurality of games, sorted based on list-specific criteria. Sorted lists of games may be referred to as game sorts. Game sorts (or game lists) may be generated, e.g., by online gaming server 102, from available games on a game platform to enable game selection by users.

In some implementations, game sorts may be categorized into various game categories based on popularity, e.g., most number of users currently playing ("popular games"), most number of users recently joined ("trending games"), etc.; revenue generation, e.g., games with highest number or value of purchases of virtual game items; taxonomy, e.g., adventure, social, etc.; personalized lists based on explicitly indicated user preferences (e.g., "I like adventure games") or implicitly derived (e.g., user A likes racing games) from user activity on the gaming platform, with user permission, etc.

In some implementations, categories (220) of games may be promoted (highlighted) to users. Example categories may include popular games (220a), top social games (220b), top adventure games (220c), games recommended for a user (220n), etc. Each category may include a list of individual games (for example, 230). In some implementations, the game sorts may be promoted on an initial display of a user via a user interface.

Highlighting games may enable users to easily navigate available games, discover game(s) of interest to them, and make a selection of their preferred game from all available games on the platform.

In some implementations, a game sort generating system may be utilized that generates about 10 game sorts at a time, and each game sort may include 200 games.

FIG. 2B is a diagram illustrating data structures associated with game sorts, in accordance with some implementations. The data structures may be stored in data store 120. In some implementations, the data structures may be stored within gaming server. In some implementations, the data structures (or versions of the data structures) may be stored in the cloud or on client devices 110.

In the illustrative example depicted in FIG. 2B, results from a game sort are depicted. An example sort (240) is depicted which includes fields such as a token, a name, and a validity time for the token.

In some implementations, a token (250a, 250b) may be used to retrieve a list of games in that category. In the illustrative example depicted in FIG. 2B, token 'T123456' (250a) is associated with the category 'popular games' and includes games 'Dungeons and Dinosaurs,' 'Kingdom of Thrones,' and 'Game of Bones.'

While 3 games are illustrated in FIG. 2B, game sorts may include a larger number of games, e.g., 100, 500, 1000 games etc. and may be utilized to present a user interface to the user that enables selection of a particular game.

In some implementations, the game sorts may be available by querying a computing device that generates the game sorts. In some implementations, game sort generation may be performed by game engine 104 described with respect to FIG. 1. The query may be transmitted via a browser query or via an application program interface (API).

In some implementations, the game sorts are updated periodically. For example, a new game sort may be generated every 60 minutes, or at some other periodic interval determined by an owner or administrator of the game platform. In some implementations, a game sort may be generated every 1 second, 10 second, 60 seconds, 1 day, etc. To provide a safe gaming environment, in some implementations, a malicious game detection technique may be implemented such that malicious game detection can be performed within a time period within the fastest game sort category is updated. In some implementations, the game sorts may be updated based on a sort refresh request from a user.

Figure 3:
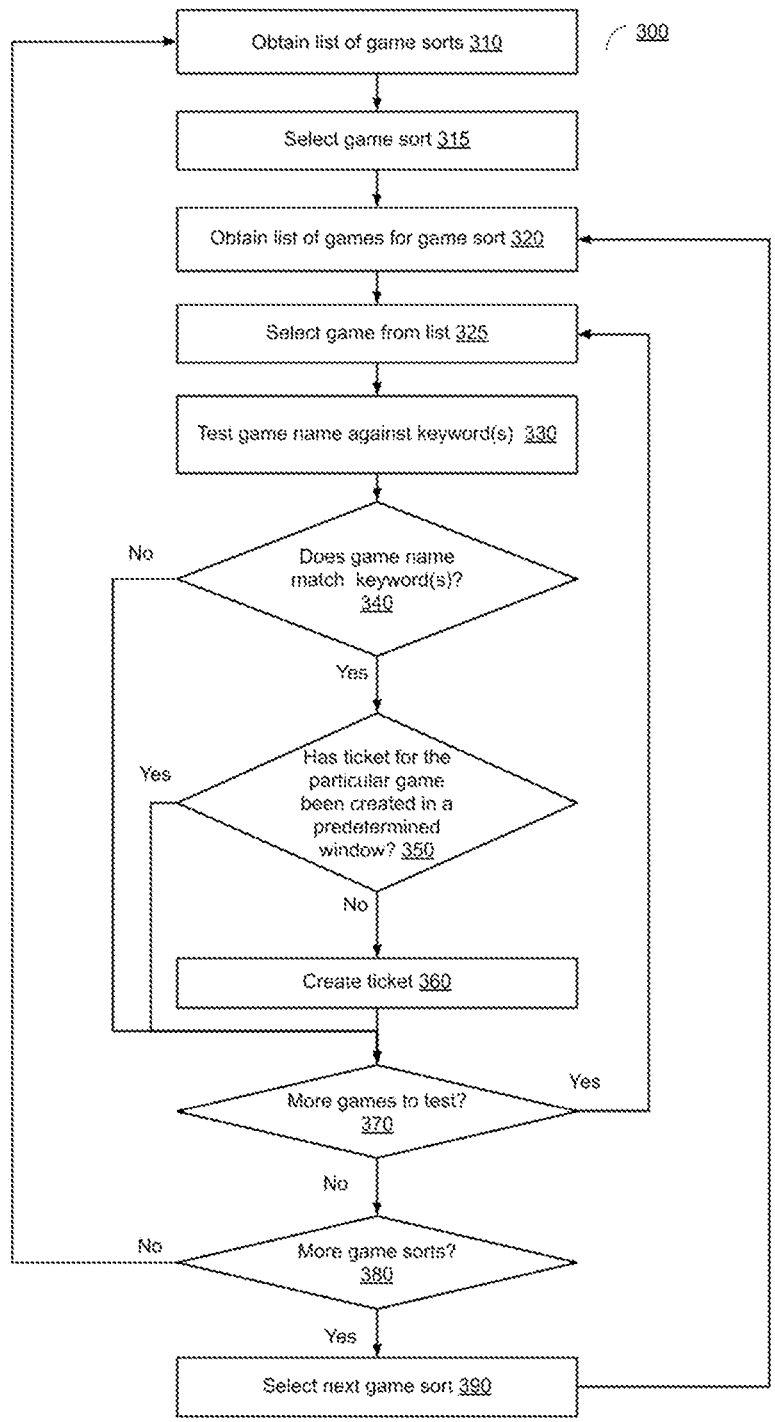
FIG. 3 is a flowchart illustrating an example method to detect malicious games based on keywords, in accordance with some implementations.

FIG. 3 is a flow diagram illustrating an example method 300 to detect malicious games based on keywords, in accordance with some implementations. In some implementations, method 300 can be implemented, for example, on gaming server 102 described in reference to FIG. 1.

Processing begins at block 310, where a list of game sorts is obtained. For example, the list of game sorts may include one or more of game sorts on the gaming platform. In some implementations, the list of game sorts may be obtained by querying a computing device or database where the list of game sorts is generated or stored. Block 310 may be followed by block 315.

At block 315, a particular game sort of the game sorts is selected. In some implementations, the list of game sorts may include a priority value for each game sort. For example, the "top-rated" and "popular" game sorts may be assigned a higher priority value over other game sorts, and may be selected before other game sorts. In some implementations, the game sorts are selected based on user settings or on previous user history. In some implementations, selection of the game sorts is based on a respective time of generation of the game sorts. In some implementations, the selection of the game sorts may proceed in a descending order of time of generation of the game sorts; e.g. a game sort generated at an earlier time may be selected before a game sort generated at a later time. In some implementations, the selection of the game sorts may proceed in an ascending order of time of generation of the game sorts; e.g. later generated games sorts are selected before earlier generated game sorts.

For example, the list of games may be a list that is common across a game platform. In another example, the list of games may be a list that is customized for a particular user (for example, based on previous user history of games played, user preferences, etc.).

In some implementations, a scanning system may be utilized that periodically retrieves the names of games that are currently being highlighted (promoted) on the platform via an API call, e.g., a list of popular games, a list of top-earning games, etc. In some implementations, the list may include games that are currently being highlighted (promoted) on a game platform. Block 315 may be followed by block 320.

At block 320, a list of games that are in the selected game sort is obtained. For example, the list of games may include game titles, that are ordered within each game sort. For examples, if games A, B, and C appear in two different game sorts, the order may be different in each game sort, based on the ranking criteria. For example, games may be ordered A-B-C in "popular games" game sort and "B-A-C" in "trending games" game sort. Block 320 may be followed by block 325 where a particular game is selected. In some implementations, it may be determined whether a ticket has been previously created for a particular game. If a ticket has been previously created for the particular game, processing may proceed from block 325 to block 370, else block 325 may be followed by block 330.

At block 330, the game name is tested by a comparison of the game name with keyword(s) associated with known malicious games. In some implementations, the comparison utilizes a matching process using regular expressions (regexp). In some implementations, a match of the game name (and/or its variants) with keywords associated with known malicious games may indicate that the game is a likely malicious game. For example, the set of keywords may also include variants of an identified set of keywords—spelling variations, upper/lower case variations, use of substituted alphanumeric characters (e.g. "RObucks," "RObux," "Robucks," "Robuck," "Roebux," or "Robuck$" instead of Robux, use of an extended ISO character set (e.g. Greek/Roman/Cyrillic characters that resemble English letters), etc. In some implementations, the keywords may include offensive or swear words or refer to e.g. explicit content, violence, etc.

In some implementations, keywords associated with known malicious games may be automatically derived from previously detected malicious games on the game platform. For example, the keywords may be generated or based upon previously generated (prior) tickets that resulted in detection/confirmation of a malicious game. In some implementations, the generation of keywords may be automatically derived from games on the platform flagged as malicious. In some implementations, the generation of keywords may be human-curated. For example, a set keyword(s) may be automatically generated, and user input may be received (for example, by gaming server 102 or game engine 104) indicative of user response to the automatically generated keyword(s). Keyword(s) may be stored, for example, in data store 120. In some implementations, the keywords may be generated using a combination of human-curated and automatic processing. Block 330 may be followed by block 340.

At block 340, it is determined whether the game name matches keyword(s) associated with known malicious games. In some implementations, the keyword(s) may be associated with a metric indicative of a probability of a game being likely malicious. For example, certain keyword(s) may be indicative of a game being likely malicious with a high degree of probability. In some implementations, a single match of a word in the game name may trigger a flagging of the game as likely malicious, while other keyword(s) may trigger a flagging of the game as likely malicious if certain other keyword(s) are also present in the game name. For example, "R0buck$" should auto-trigger irrespective of whether other keywords match, but "Race amazing cars, earn Robux faster, join the best racers" may only be a match if "amazing cars" and "best racers" both are keywords.

If the match between the game name and the keyword(s) meets a threshold match level, the game is flagged as a likely malicious game, and processing continues to block 350. Else, block 340 is followed by block 370.

At block 350, a check is made as to whether a ticket for the particular game been created in a predetermined window, and whether a predetermined time period has elapsed from a previous ticket creation time of the likely malicious game.

In some implementations, the predetermined window may be utilized to avoid repeated flagging of the same likely malicious game. A check is performed by the ticketing system to verify if a ticket for the likely malicious game in question has already been created. In some implementations, a processing rate may be determined that is indicative of a rate at which tickets can be processed, e.g., by human support staff or algorithms that evaluate each ticket and that the rate is taken into account to determine the duration of the predetermined window. In a situation where a ticket has been created during the predetermined window, an additional ticket for the same likely malicious game is not created until some predetermined time (which may be minutes, hours, or days long) has passed.

In some implementations, verifying that a predetermined time period has elapsed from a previous ticket creation time associated with the likely malicious game may utilize a time to live (TTL) cache. The TTL cache limits the time that a previously created ticket is stored. In some implementations, the TTL cache may be implemented as a counter or timestamp attached to a data record associated with the previously created ticket.

In some implementations, a ticket previously created for a likely malicious game within a predetermined time period may be augmented or modified to indicate that the game was flagged as likely malicious in a subsequent check. In some implementations, the ticket may be augmented with an indicator of the type of check that was performed. In some implementations, a priority for a created ticket may be adjusted based on a number of checks that flagged the game as likely malicious. In some implementations, a priority for a created ticket may be adjusted based on a number of game sorts that include the likely malicious game.

If it is determined at block 350 that no ticket for the particular game has been created within a predetermined window, block 350 is followed by block 360. Else, block 350 is followed by block 370.

A ticket for the likely malicious game is created at block 360. In some implementations, the ticket identifies the likely malicious game and includes one or more descriptors of the likely malicious game.

In some implementations, the details about the game are passed by a scanning system to a separate ticketing system which creates a ticket (work item) in a support or tasking system that alerts staff associated with the game platform to review the likely malicious game in question and take appropriate action.

In some implementations, the descriptors may include a title of the likely malicious game, an owner of the likely malicious game, a link to an account of the owner of the likely malicious game, a uniform resource locator (URL) to the likely malicious game, number of upvotes or downvotes for the likely malicious game, and player count for the likely malicious game at a time of generation of the list.

In some implementations, the likely malicious game may be removed from the list of games prior to generating a user interface that displays the list of games. In some implementations, the likely malicious game may be rendered ineligible for user selection.

In some implementations, the likely malicious game may be assigned a lower weight and displayed at a lower priority (for example, less prominently, with a lower rank that originally assigned, etc.). In some implementations, the likely malicious game may be indicated as "possibly malicious." In some implementations, users currently participating (playing the game) may be alerted to the possibly malicious nature of the game. Block 360 may be followed by block 370.

At block 370, it is determined if there are additional games from the game sort to be tested. If there are additional games, block 370 is followed by block 325, else block 370 is followed by block 380.

At block 380, it is determined whether there are additional game sorts to be considered for testing. If there are additional game sorts, block 380 is followed by block 390, else block 380 is followed by block 310.

If there are additional game sorts to be tested, the next game sort for testing is selected at block 390. Processing continues to block 320 with a selection of a game within the selected game sort.

Blocks 310-390 can be performed (or repeated) in a different order than described above and/or one or more steps can be omitted. For example, block 360 may be performed and tickets generated for all detected likely malicious games after all games within a game sort have been checked, or after all the game sorts have been checked for likely malicious games.

In some implementations, block 350 may be omitted, and block 340 may be followed by block 360. In these implementations, duplicate tickets may be created.

In some implementations, multiple game sorts may be selected at block 315 and blocks 320-380 may be performed in parallel, for each selected game sort. In some implementations, multiple games may be selected at block 325 and blocks 330-370 may be performed in parallel, for each selected game. Performing some blocks in parallel in this manner may reduce the time to detect a malicious game, e.g., since multiple games are analyzed substantially at the same time to determine whether it is a malicious game. In some implementations, blocks of method 300 may be performed in the sequence shown in FIG. 3. For example, performing the method in this manner may enable malicious game detection to be performed even when a limited amount of computational resources is available.

In some implementations, all games on the game platform (not just the game being highlighted on the platform) may be scanned at a predetermined frequency (e.g. every day, every other day, every hour, etc.) to detect any game that may include offensive content to mitigate user access to such content.

Figure 4:
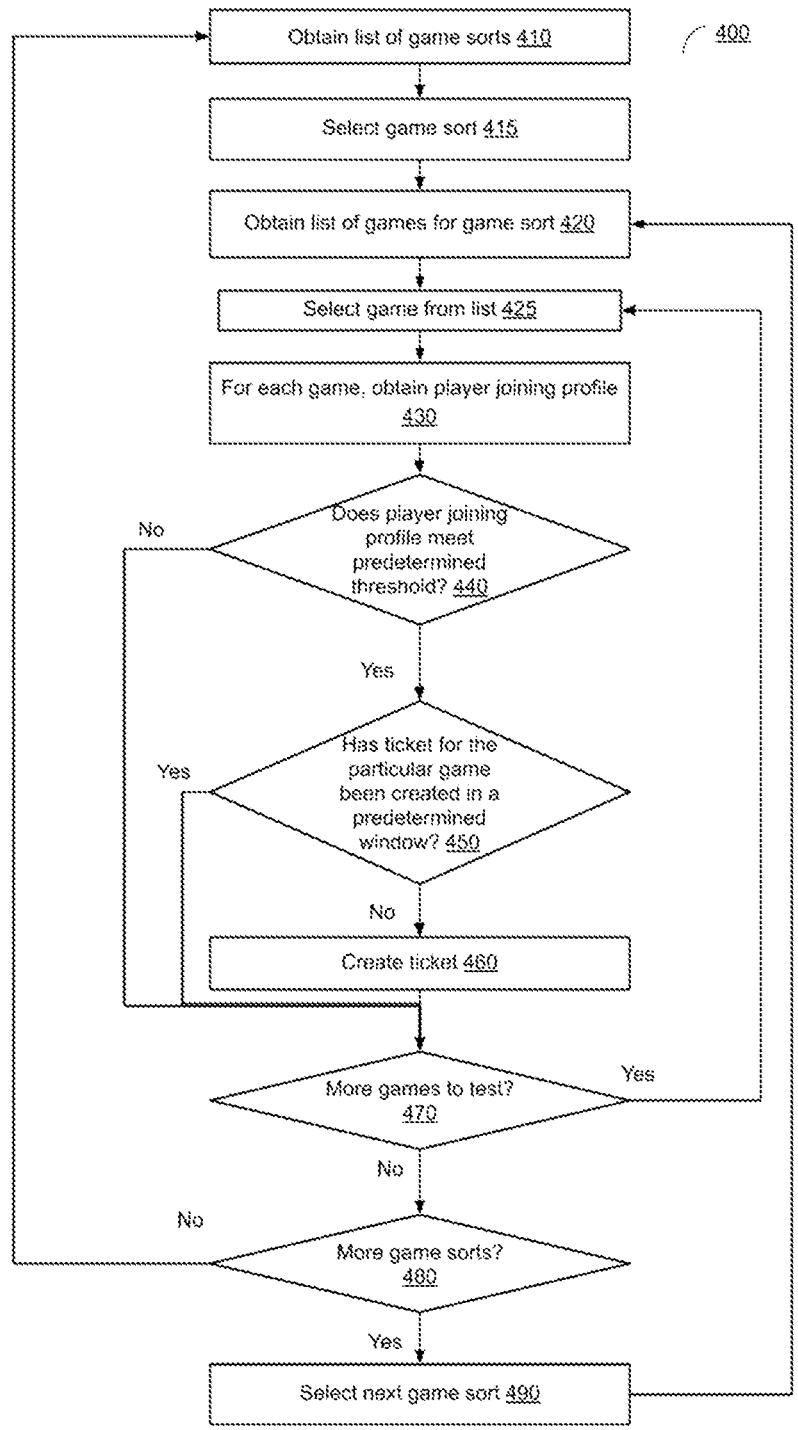
FIG. 4 is a flowchart that illustrates an example method to detect malicious games based on momentum metrics, in accordance with some implementations.

FIG. 4 is a flowchart that illustrates an example method 400 to detect malicious games based on momentum metrics, in accordance with some implementations. In some implementations, method 400 can be implemented, for example, by gaming server 102 described with reference to FIG. 1.

Processing begins at block 410, where a list of game sorts (for example, similar to game sort 240) is obtained and one of the game sorts is selected at block 415. In some implementations, the list of game sorts may be obtained by querying a computing device or database where the list of game sorts is generated or stored.

In some implementations, the list of games may be a list that is common across a game platform. In some implementations, the list of games may be a list that is customized for a particular user (for example, based on previous user history of games played, user preferences, etc.).

In some implementations, the list may include games that are currently being highlighted (promoted) on a game platform (for example, similar to games included in lists 220 as described with respect to FIG. 2). Block 415 may be followed by block 420.

At block 420, a list of games for the selected game sort is obtained, and a particular game from the selected game sort is selected at 425.

In some implementations, it may be determined whether a ticket has been previously created for a particular game. If a ticket has been previously created for the particular game, processing may proceed from block 425 to block 470, else block 425 may be followed by block 430.

At block 430, a player joining profile (user joining profile) of users playing the selected game (the game selected at block 425) is obtained. The player joining profile may be a time-based profile that provides information about the number of players playing the game, and information about the time of joining of the players. In some implementations, the player joining profile may include a metric indicative of a joining rate (velocity) of players of the game. In some implementations, the player joining profile may include data regarding the players of the game. In some implementations, geographical distribution of users may be obtained. For example, authentication details associated with the user, IP address associated with the user, geolocation information, etc. may be obtained and utilized as part of the player joining profile information. Block 430 may be followed by block 440.

At block 440, the obtained player joining profile is compared against predetermined criteria for player joining profiles that are indicative of likely malicious games.

In some implementations, a profile parameter of the game is compared to a threshold profile. In some implementations, the profile parameter is indicative of a rate of change of game popularity. The player joining profile ("velocity profile" of the game) can be indicative of a likely malicious nature of the game—for example, a game that instantaneously appears to be popular is likely to be manipulated game, e.g., by using "fake accounts" that were created to join the game and thereby lure other users to the game.

In some implementations, a game that match a player joining profile where either the game appears suddenly in a list and/or at an initial appearance in a list has a large number of players in the game is considered to be a likely malicious game.

In some implementations, a list of the most popular games (for example, a top 1000 games, a top 10,000 games, etc.) in the game platform may be maintained and rapid upward movement detected in a number of new users tracked for each game in order to detect a large number of new sign-ups. In some implementations, a threshold may be utilized to detect changes to signup frequency that are outside of previously recorded historical patterns for the game. The threshold may be based on prior history that is recorded and stored. In some implementations, different thresholds may be utilized for different game sorts and may be based on a level of reporting accuracy.

In some implementations, a measure of suddenness of appearance of the game on a list of popular games may be utilized as a profile parameter. For example, if a list of hundred most popular games is generated at a certain frequency (e.g., hourly, daily, etc.), it may be normal for a game to enter the list at a low position on the list and move within the list at each subsequent generation. A game that appears directly in the top ten games may then be determined to be a sudden appearance on the list of popular games. In other types of lists, other criteria specific to the list (e.g., game earnings, active players, purchases of items within the game, etc.) may be used to determine the suddenness of appearance.

In some implementations, a measure of a number of players associated with the game at a time of first appearance of the game on the list of popular games may be utilized as a profile parameter.

In some implementations, multiple profile parameters may be utilized. For example, in some implementations, a measure of the number of players associated with the game at a time of first appearance of the game may be utilized in combination with the measure of suddenness of appearance of the game.

At block 440, if the obtained player joining profile meets the predetermined criteria for player joining profiles, processing continues to block 450. Else, block 440 is followed by block 470.

At block 450, a check is made as to whether a ticket for the particular game been created in a predetermined window, and whether a predetermined time period has elapsed from a previous ticket creation time of the likely malicious game.

In some implementations, verifying that a predetermined time period has elapsed from a previous ticket creation time associated with the likely malicious game may utilize a TTL cache.

If it is determined at block 450 that a ticket for the particular game has not been created within a predetermined window, block 450 is followed by 460. Else, block 450 is followed by 470.

A ticket for the likely malicious game is created at block 460. In some implementations, the ticket identifies the likely malicious game and includes one or more descriptors of the likely malicious game.

In some implementations, the details about the game are passed by a scanning system to a separate ticketing system which creates a ticket (work item) in a support or tasking system that alerts staff associated with the game platform to review the likely malicious game in question and take appropriate action.

In some implementations, the descriptors may include a title of the likely malicious game, an owner of the likely malicious game, a link to an account of the owner of the likely malicious game, a uniform resource locator (URL) to the likely malicious game, number of upvotes or downvotes for the likely malicious game, and player count for the likely malicious game at a time of generation of the list.

In some implementations, the likely malicious game may be removed from the list of games prior to generating a user interface that displays the list of games. In some implementations, the likely malicious game may be rendered ineligible for user selection.

In some implementations, the likely malicious game may be assigned a lower weight and displayed at a lower priority (for example, less prominently, with a lower rank that originally assigned, etc.). In some implementations, the likely malicious game may be indicated as "possibly malicious." In some implementations, users currently participating (playing the game) may be alerted to the possibly malicious nature of the game. Block 460 may be followed by block 470.

At block 470, it is determined if there are additional games from the game sort to be tested. If there are additional games, block 470 is followed by block 425, else block 470 is followed by block 480.

At block 480, it is determined whether there are additional game sorts to be considered for testing. If there are additional game sorts, block 480 is followed by block 490, else block 480 is followed by block 410.

If there are additional game sorts to be tested, the next game sort for testing is selected at block 490. Processing continues to block 420 with a selection of a game within the selected game sort.

Blocks 410-490 can be performed (or repeated) in a different order than described above and/or one or more steps can be omitted. For example, block 460 may be performed and tickets generated for all detected likely malicious games after all games within a game sort have been checked, or after all the game sorts have been checked for likely malicious games.

In some implementations, multiple game sorts may be selected at block 415 and blocks 420-480 may be performed in parallel, for each selected game sort. In some implementations, multiple games may be selected at block 425 and blocks 430-470 may be performed in parallel, for each selected game. Performing some blocks in parallel in this manner may reduce the time to detect a malicious game, e.g., since multiple games are analyzed substantially at the same time to determine whether it is a malicious game. In some implementations, blocks of method 400 may be performed in the sequence shown in FIG. 4. For example, performing the method in this manner may enable malicious game detection to be performed even when a limited amount of computational resources is available.

In some implementations, all games on the game platform (not just the game being highlighted on the platform) may be scanned at a predetermined frequency (e.g. every day, every other day, every hour, etc.) to detect any game that may include offensive content to mitigate user access to such content.

In some implementations, the likely malicious game may be removed from the list of games prior to generating a user interface that includes one or more games from the list of games.

Figure 5:
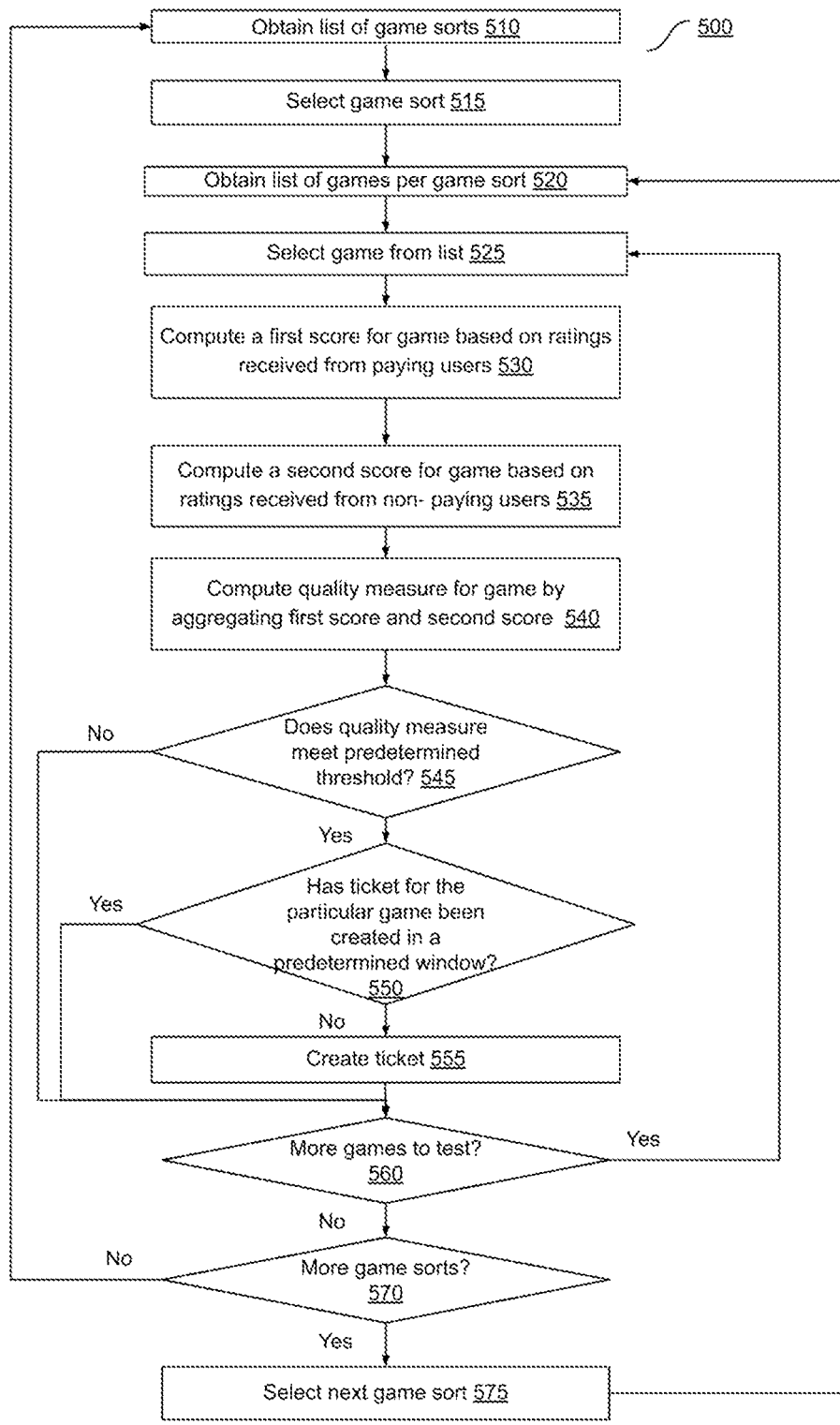
FIG. 5 is a flowchart illustrating a method to detect malicious games based on weighted metrics, in accordance with some implementations.

FIG. 5 is a flowchart illustrating a method 500 to detect malicious games based on weighted metrics, in accordance with some implementations.

Weighted metrics-based methods may be particularly effective for detection of malicious games which employ automated accounts (for example, bot accounts) or fake accounts that provide favorable ratings in an attempt to increase popularity of the malicious game.

In some implementations, method 500 can be implemented, for example, on gaming server 102 described in reference to FIG. 1.

Processing begins at block 510, where a list of game sorts (for example, similar to game sort 240) is obtained. Processing continues to block 515, where a game sort is selected. In some implementations, the list of game sorts may be obtained by querying a database that stores a list of game sorts or a computing device that generates the list of game sorts. Block 515 may be followed by block 520.

At block 520, a list of games for the selected game sort is obtained. Processing continues to block 525, where a particular game from the selected game sort is selected. Block 525 may be followed by block 530.

At block 530, a first score for the game is computed based on feedback metrics (ratings received from users; for example, likes, dislikes, upvotes, downvotes, etc.) received from paying users. A data structure (for example, stored in data store 120) may be utilized to indicate a status of a user as paying or non-paying based on previous user history on the game platform. In some implementations, the first score is computed at a time of a user entering or leaving a respective game.

In some implementations, a threshold spending amount may be used to determine whether a user is a paying user or not. In some implementations, a pattern of previous user spending may be utilized to determine whether a user is a paying user. In some implementations, the ratings may include a feedback metric (for example, an upvote or downvote received for the game from one of the users of the game). Block 530 may be followed by block 535.

At block 535, a second score for the game is computed based on feedback metrics received from non-paying users. In some implementations, the second score of the game is computed based on feedback metrics received from all users, including paying users and non-paying users. In some implementations, the paying users and the non-paying users may be determined at a platform-level, e.g., if a user made a payment to the platform (e.g., to purchase a game item, an avatar, an accessory, etc.), the user may be classified as a paying user, and otherwise, the user may be classified as a non-paying user. In some implementations, the classification of paying and non-paying users may be performed at a game-category level (e.g., paying user of action games), at an individual game level, etc. In some implementations, feedback metrics from users who made payments in known malicious games and not in other games, may be excluded from computation of the second score.

In some implementations, the first score and the second score may each be a Wilson score interval computed based on received feedback metrics. In some implementations, a confidence level value of 0.95 may be utilized for feedback received from a paying user. In some implementations, a confidence level value of 0 may be utilized for feedback received from a non-paying user. In some implementations, other values may be utilized for confidence values. Block 535 may be followed by block 540.

At block 540, a quality measure for the game by is computed by aggregating the first and second scores. In some implementations, the feedback metrics may be weighted (for example, by a paying user metric weight), by a metric weight, prior to calculating the first score. In some implementations, the first score may be weighted (for example, by a paying user score weight) by a score weight, prior to calculating the quality measure.

In some implementations, a ratio of a weight applied to a paying user to a weight applied to a non-paying user (paying user weight ratio) may lie between 1 and 1000. In some implementations, a weight applied to a rating received from a paying user may be e.g. 2, 10, 100, 100, or 1000 times (and ratios that lie between) a weight that is applied to a rating received from a non-paying user.

In some implementations, the weight ratio is a configurable parameter. In some implementations, different weight ratios may be utilized for different game categories. In some implementations, the weight ratio is dependent on a number of received ratings, a number of ratings from paying users, a number of ratings from non-paying users, etc. In some implementations, recent ratings may be weighed differently from older ratings (e.g., if the game has new content or is an updated version).

In some implementations, the quality measure for the game may be based on a Wilson score confidence interval for the ratings received from paying and non-paying users. Block 540 may be followed by block 545.

At block 545, the quality measure for the game is compared against a predetermined threshold (for example, a minimum required score) that is indicative of a likely malicious game. By applying appropriate weights to ratings (votes) received from paying users (users who have spent money on the platform) and non-paying users, a likely malicious game can be detected. In some implementations, by applying a higher weight to paying users, a financial cost for a malicious actor to distort the vote score for a particular game, e.g., by utilizing bots is higher, which acts as a deterrent to creators of malicious games.

In some implementations, the threshold is a predetermined parameter (number) for a given range of number of active users of the game. In some implementations, the threshold may be a predetermined parameter independent of the number of users of the game. In some implementations, the threshold for the game may be computed based on a number of active users (players) of the game.

In some implementations, a number of active players in the game, is used as an additional variable. In some implementations, tiered score criteria or dynamic score criteria may be established to enforce a higher standard for games based on the number of active players in that game, since games with a greater number of active players are more likely to be highlighted on the game platform.

In some implementations, the tiered criteria is a defined set of "minimum score: population range." For example, for a game with 1000-10,000 active players, a minimum score may be set at 0.7; for a game with 10,000-1000,000 active players, the minimum score may be set at 0.8; for a game with greater than 100,000 active players; the minimum score may be set at 0.85; etc.

In some implementations, dynamic criteria may be utilized and a formula may be used to determine (compute) a minimum score for a given user population count.

At block 545, it is determined whether the quality measure meets the predetermined threshold. If the quality measure meets the predetermined threshold, processing continues to block 550. Else, processing continues to block 570.

At 550, it is determined whether a ticket for the particular game been created in a predetermined window (using for example, a TTL cache).

In some implementations, verifying that a predetermined time period has elapsed from a previous ticket creation time associated with the likely malicious game may utilize a TTL cache.

If it is determined at block 550, if it is determined that a ticket for the particular game has not been created within a predetermined window, processing continues to 555. Else, processing continues to 560.

At block 555, a ticket for the likely malicious game is created. In some implementations, the ticket identifies the likely malicious game and includes one or more descriptors of the likely malicious game.

In some implementations, the details about the game are passed by a scanning system to a separate ticketing system which creates a ticket (work item) in a support or tasking system that alerts staff associated with the game platform to review the likely malicious game in question and take appropriate action.

In some implementations, the descriptors may include a title of the likely malicious game, an owner of the likely malicious game, a link to an account of the owner of the likely malicious game, a uniform resource locator (URL) to the likely malicious game, number of upvotes or downvotes for the likely malicious game, and player count for the likely malicious game at a time of generation of the list.

In some implementations, the likely malicious game may be removed from the list of games prior to generating a user interface that displays the list of games. In some implementations, the likely malicious game may be rendered ineligible for user selection.

In some implementations, the likely malicious game may be assigned a lower weight and displayed at a lower priority (for example, less prominently, with a lower rank that originally assigned, etc.). In some implementations, the likely malicious game may be indicated as "possibly malicious." In some implementations, users currently participating (playing the game) may be alerted to the possibly malicious nature of the game. Block 555 may be followed by block 560.

At block 560, it is determined whether there are additional games from the game sort to be tested. If there are additional games, block 560 is followed by block 525, else processing continues to block 570.

At block 570, it is determined whether there are additional game sorts to be considered for testing. If there are additional game sorts to be tested, processing continues to block 575, else processing continues to block 510.

At block 575, the next game sort for testing is selected. Processing continues to block 520.

Blocks 510-575 can be performed (or repeated) in a different order than described above and/or one or more steps can be omitted.

For example, block 555 may be performed and tickets generated for all detected likely malicious games after all games within a game sort have been checked, or after all the game sorts have been checked for likely malicious games.

In some implementations, block 550 may be omitted, and block 545 may be followed by block 555. In these implementations, duplicate tickets may be created.

In some implementations, multiple game sorts may be selected at block 515 and blocks 520-570 may be performed in parallel, for each selected game sort. In some implementations, multiple games may be selected at block 515 and blocks 520-560 may be performed in parallel, for each selected game. Performing some blocks in parallel in this manner may reduce the time to detect a malicious game, e.g., since multiple games are analyzed substantially at the same time to determine whether it is a malicious game. In some implementations, blocks of method 500 may be performed in the sequence shown in FIG. 5. For example, performing the method in this manner may enable malicious game detection to be performed even when a limited amount of computational resources is available.

In some implementations, it may be determined whether a ticket has been previously created for a particular game. If a ticket has been previously created for the particular game, processing may proceed from block 520 to block 560. Proceeding to block 560 may improve the computational efficiency of the detection of malicious games.

In some implementations, all games on the game platform (not just the game being highlighted on the platform) may be scanned at a predetermined frequency (e.g. every day, every other day, every hour, etc.) to detect any game that may include offensive content to mitigate user access to such content.

In some implementations, method 500 may be combined with one or more additional methods (for example, method 300 described with respect to FIG. 3 and/or method 400 described with respect to FIG. 4) to detect a likely malicious game. Accordingly, in an example implementation, a player joining profile may be utilized in combination with a comparison of the game name with keyword(s) associated with known malicious games.

In some implementations, a consensus-based approach based on a combination of keyword(s)-based, metrics-based, player-joining-profile based approaches, etc., may be utilized to detect a likely malicious game. For example, a ticket may be created for a likely malicious game if a majority of approaches (for example, two or more of three approaches) utilized to test a candidate game are indicative of a likely malicious game.

In some implementations, a combination of signals may be utilized to detect a likely malicious game. A numerical metric may be generated by each approach indicative of a certainty of detection of a likely malicious game, based on the algorithm utilized. A weighted or unweighted combination of the metrics generated using each approach may be determined and compared to a threshold to detect a likely malicious game.

In some implementations, machine learning techniques may be utilized to improve future detection of likely malicious games. Machine learning techniques can be used to correlate other variables with a likelihood that a game is malicious; for example, (i) reputation of the game creator, (ii) content of the game, (iii) reputations of the players joining a game, (iv) games with high player join rates where the game is not being found through searching on the site, etc.

Figure 6A:
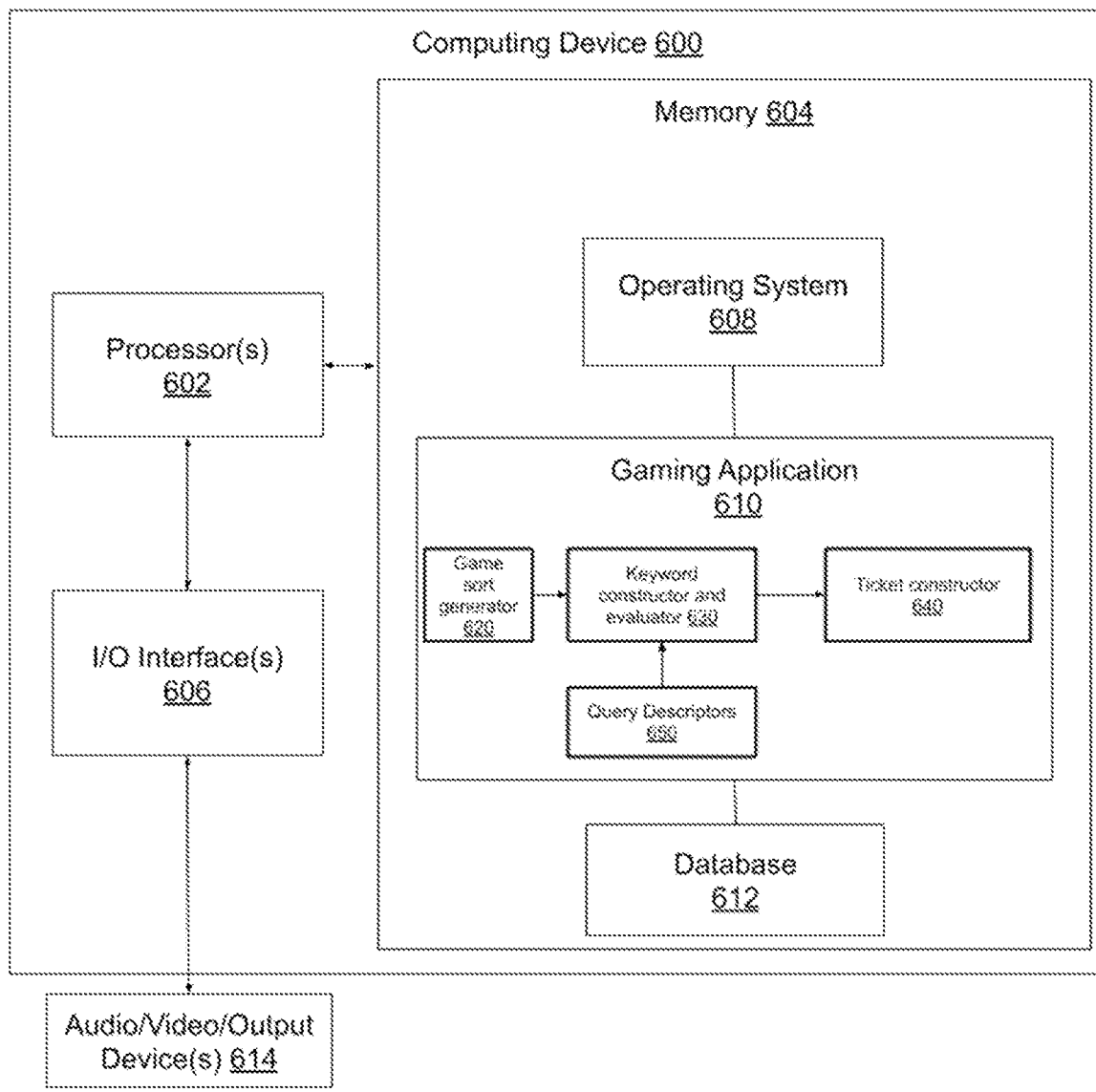
FIG. 6A is a block diagram illustrating an example computing device, in accordance with some implementations.

FIG. 6A is a block diagram of an example computing device 600 which may be used to implement one or more features described herein. In one example, device 600 may be used to implement a computer device, (e.g., 102 and/or 110 of FIG. 1), and perform appropriate method implementations described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 600 includes a processor 602, a memory 604, input/output (I/O) interface 606, and audio/video input/output devices 614.

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, one or more applications 610, e.g., an audio spatialization application and application data 612. In some implementations, application 610 can include instructions that enable processor 602 to perform the functions (or control the functions of) described herein, e.g., some or all of the methods of FIGS. 3, 4, and 5.

In some implementations, gaming application 610 may include a game sort generator (620) that is utilized to generate game sorts. Output(s) (game sorts, game lists, etc.) from the game sort generator 620 are provided to keyword constructor and evaluator 630, where the game name(s) from the game sorts is tested by a comparison of the game name with keyword(s) associated with known malicious games. Query descriptors 650 are constructed by utilizing keyword(s) based on previously detected malicious games. Upon detection of a likely malicious game, one or more descriptors associated the likely malicious game are provided to ticket constructor 640.

For example, applications 610 can include an audio spatialization module 612, which as described herein can provide audio spatialization within an online gaming server (e.g., 102). Any of software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 120), and input/output devices can communicate via interface 606. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 614 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 6A shows one block for each of processor 602, memory 604, I/O interface 606, and software blocks 608 and 610. These blocks may represent one or more processors or processing circuitries, operating systems, memories, I/O interfaces, applications, and/or software engines. In other implementations, device 600 may not have all of the components shown and/or may have other elements including other types of elements instead of, or in addition to, those shown herein. While the online gaming server 102 is described as performing operations as described in some implementations herein, any suitable component or combination of components of online gaming server 102 or similar system, or any suitable processor or processors associated with such a system, may perform the operations described.

A user device can also implement and/or be used with features described herein. Example user devices can be computer devices including some similar components as the device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 300, 400, 500, etc.) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Figure 6B:
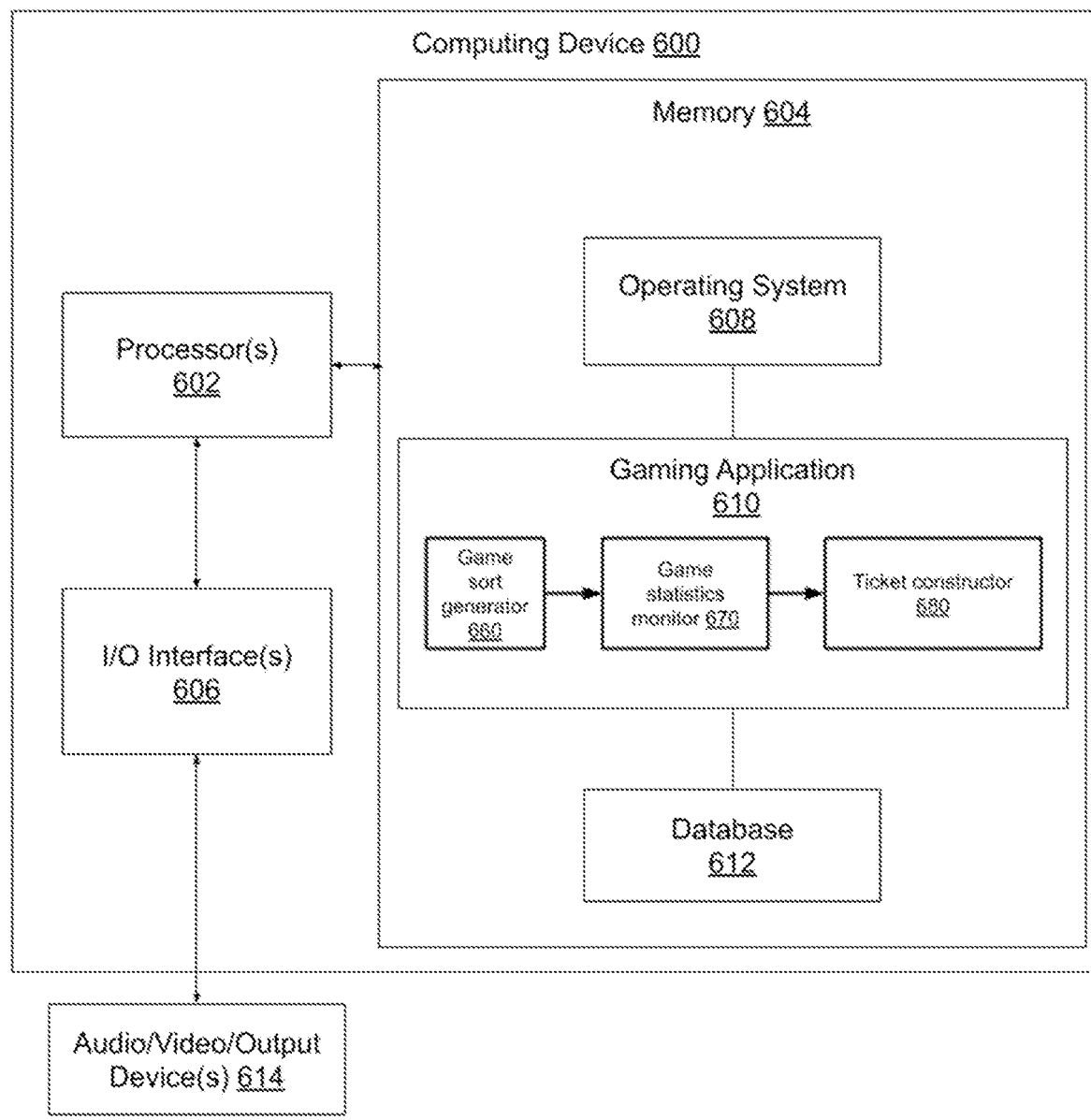
FIG. 6B is a block diagram illustrating an example computing device, in accordance with some implementations.

FIG. 6B is a block diagram of an example computing device 600 which may be used to implement one or more features described herein. For ease of illustration, components similar to those described in FIG. 6A are numbered in a like manner.

In some implementations, gaming application 610 may include a game sorter (game sort generator) 660 that is utilized to generate multiple lists of games based on different parameters. Lists generated by game sorter 660 (for example, lists obtained in block 410 described with respect to FIG. 4) are analyzed by a game statistics monitor 670 that monitors statistics (for example, a player joining profile obtained in block 430 described with respect to FIG. 4) associated with each of the games in the list(s). A ticket generator (ticket constructor) 680 generates tickets based on the game statistics provided by the game statistics monitor 670.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
obtaining, by a processor, a list of games, wherein the list includes a plurality of games, wherein obtaining the list of games comprises querying a database that stores one or more game sorts, and wherein the list of games includes unique games in the game sorts;
calculating a first score for a game of the plurality of games based on respective feedback metrics received from a plurality of paying users;
calculating a second score for the game based on respective feedback metrics received from a plurality of non-paying users;
calculating a quality measure for the game based on aggregating the first score and the second score;
comparing the quality measure against a threshold;
determining the game to be a likely malicious game if the quality measure of the game meets the threshold; and
creating a ticket, wherein the ticket identifies the likely malicious game.

2. The computer-implemented method of claim 1, further comprising applying a metric weight to each feedback metric from the plurality of paying users prior to calculating the first score.

3. The computer-implemented method of claim 1, further comprising applying a score weight to the first score prior to calculating the quality measure.

4. The computer-implemented method of claim 1, further comprising, prior to creating the ticket, verifying that a predetermined time period has elapsed from a previous ticket creation time associated with the likely malicious game.

5. The computer-implemented method of claim 1, further comprising:
receiving the list of games that includes the likely malicious game;
removing the likely malicious game from the list of games to create a second list of games; and
generating a user interface that includes the second list of games.

6. The computer-implemented method of claim 1, wherein the first score and the second score are respective Wilson scores.

7. The computer-implemented method of claim 1, further comprising computing the threshold for the game based on a total number of the plurality of paying users and the plurality of non-paying users.

8. The computer-implemented method of claim 1, wherein the feedback metrics include at least one of an upvote received for the game or a downvote received for the game.

9. The computer-implemented method of claim 1, wherein the threshold is a predetermined parameter independent of a total number of the plurality of paying users of the game and the plurality of non-paying users of the game.

10. A non-transitory computer-readable medium comprising instructions that, responsive to execution by a processing device, causes the processing device to perform operations comprising:
obtaining a list of games, wherein the list includes a plurality of games, wherein obtaining the list of games comprises querying a database that stores one or more game sorts, and wherein the list of games includes unique games in the game sorts;
calculating a first score for a game of the plurality of games based on respective feedback metrics received from a plurality of paying users;
calculating a second score for the game based on respective feedback metrics received from a plurality of non-paying users;
calculating a quality measure for the game based on aggregating the first score and the second score;
comparing the quality measure against a threshold;
determining the game to be a likely malicious game when the quality measure of the game meets the threshold; and
creating a ticket, wherein the ticket comprises the likely malicious game.

11. The non-transitory computer-readable medium of claim 10, wherein the operations further comprise applying a metric weight to each feedback metric from the plurality of paying users, prior to calculating the first score.

12. The non-transitory computer-readable medium of claim 10, wherein the operations further comprise applying a score weight to the first score prior to calculating the quality measure.

13. The non-transitory computer-readable medium of claim 10, wherein the first score and the second score are respective Wilson scores.

14. The non-transitory computer-readable medium of claim 10, wherein the operations further comprise computing the threshold for the game based on a total number of the plurality of paying users and the plurality of non-paying users.

15. The non-transitory computer-readable medium of claim 10, wherein the feedback metrics include at least one of an upvote received for the game or a downvote received for the game.

16. The non-transitory computer-readable medium of claim 10, wherein the operations further comprise prior to creating the ticket, verifying that a predetermined time period has elapsed from a previous ticket creation time associated with the likely malicious game.

17. A system comprising:
a memory with instructions stored thereon; and
a processing device, coupled to the memory, the processing device configured to access the memory and execute the instructions, wherein the instructions cause the processing device to perform operations including:
obtaining a list of games, wherein the list includes a plurality of games, wherein obtaining the list of games comprises querying a database that stores one or more game sorts, and wherein the list of games includes unique games in the game sorts;
calculating a first score for a game of the plurality of games based on respective feedback metrics received from a plurality of paying users;
calculating a second score for the game based on respective feedback metrics received from a plurality of non-paying users;
calculating a quality measure for the game based on aggregating the first score and the second score;
comparing the quality measure against a threshold;
determining the game to be a likely malicious game when the quality measure of the game meets the threshold; and
creating a ticket, wherein the ticket comprises the likely malicious game.

18. The system of claim 17, wherein the operations further comprise applying a metric weight to each feedback metric from the plurality of paying users, prior to calculating the first score.

19. The system of claim 17, wherein the operations further comprise applying a score weight to the first score prior to calculating the quality measure.

20. The system of claim 17, wherein the first score and the second score are respective Wilson scores.

* * * * *